(12) United States Patent
Kim et al.

(10) Patent No.: US 10,558,242 B2
(45) Date of Patent: Feb. 11, 2020

(54) FOLDABLE DISPLAY DEVICE

(71) Applicant: LG Display Co., Ltd., Seoul (KR)

(72) Inventors: Jun-Hyung Kim, Seoul (KR); Han-UL Lee, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/224,260

(22) Filed: Dec. 18, 2018

(65) Prior Publication Data

US 2019/0196548 A1    Jun. 27, 2019

(30) Foreign Application Priority Data

Dec. 27, 2017  (KR) .......................... 10-2017-0180863

(51) Int. Cl.
*G06F 1/16*   (2006.01)
*G09F 9/30*   (2006.01)

(52) U.S. Cl.
CPC .......... *G06F 1/1652* (2013.01); *G06F 1/1616* (2013.01); *G06F 1/1681* (2013.01); *G09F 9/301* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,304,539 B2* | 4/2016 | Song | .............. | G06F 1/1601 |
| 9,348,450 B1* | 5/2016 | Kim | .............. | G06F 1/1681 |
| 9,600,035 B2* | 3/2017 | Park | .............. | G06F 1/1681 |
| 9,791,892 B2* | 10/2017 | Park | .............. | G06F 1/1652 |
| 9,983,428 B2* | 5/2018 | Im | .............. | G02F 1/133308 |
| 10,015,897 B1* | 7/2018 | Hong | .............. | H05K 5/0217 |
| 10,054,990 B1* | 8/2018 | Harmon | .............. | G06F 1/1681 |
| 10,082,827 B2* | 9/2018 | Yamauchi | .............. | G06F 1/1616 |
| 10,082,839 B1* | 9/2018 | Turchin | .............. | G06F 1/1641 |
| 10,120,421 B1* | 11/2018 | Hong | .............. | G06F 1/1681 |
| 10,133,303 B2* | 11/2018 | Park | .............. | G06F 1/1681 |
| 10,297,785 B2* | 5/2019 | Ahn | .............. | H05K 1/028 |
| 2015/0055287 A1* | 2/2015 | Seo | .............. | G06F 1/1652 |
| | | | | 361/679.27 |
| 2015/0153787 A1* | 6/2015 | Mok | .............. | G06F 1/1652 |
| | | | | 361/679.27 |
| 2015/0185782 A1* | 7/2015 | Kim | .............. | G06F 1/1652 |
| | | | | 349/12 |
| 2016/0085265 A1 | 3/2016 | Park et al. | | |

(Continued)

FOREIGN PATENT DOCUMENTS

CN   105448194 A   3/2016
JP   2013-174692 A   9/2013

(Continued)

*Primary Examiner* — Lisa Lea-Edmonds
(74) *Attorney, Agent, or Firm* — Birch, Stewart, Kolasch & Birch, LLP (57) ABSTRACT

A foldable display device that enables convenient and easy coupling of a display panel to a housing is provided. The foldable display device includes a mounting member provided at a location between a lower plate and the housing and is capable of realizing a slim bezel design by eliminating coupling portions protruding from both ends of the lower plate and by improving the coupling structure between the lower plate and the housing using the mounting member.

18 Claims, 5 Drawing Sheets

(56) References Cited

U.S. PATENT DOCUMENTS

| | | | |
|---|---|---|---|
| 2016/0195901 A1* | 7/2016 | Kauhaniemi | G06F 1/1652 |
| | | | 361/679.27 |
| 2016/0299532 A1 | 10/2016 | Gheorghiu et al. | |
| 2017/0075459 A1 | 3/2017 | Kauhaniemi et al. | |
| 2018/0150112 A1* | 5/2018 | Aoki | G06F 1/1652 |
| 2019/0018458 A1* | 1/2019 | Turchin | G06F 1/1641 |
| 2019/0036068 A1* | 1/2019 | Kim | H01L 51/5237 |
| 2019/0132432 A1* | 5/2019 | Park | H04M 1/0216 |

FOREIGN PATENT DOCUMENTS

| | | |
|---|---|---|
| KR | 10-2016-0083608 A | 7/2016 |
| KR | 10-2017-0026021 A | 3/2017 |
| KR | 10-2017-0026023 A | 3/2017 |

* cited by examiner

FOLDABLE DISPLAY DEVICE

CROSS-REFERENCE TO RELATED APPLICATION

This application claims the priority benefit of Korean Patent Application No. 10-2017-0180863, filed on Dec. 27, 2017 in the Republic of Korea, which is hereby incorporated by reference as if fully set forth herein.

BACKGROUND OF THE INVENTION

Field of the Invention

The present invention relates to a foldable display device including a display panel that is capable of being folded or unfolded when it is used.

Discussion of the Related Art

There are various kinds of display devices for displaying images, for example, liquid crystal display (LCD) devices, plasma display panel (PDP) devices, organic light-emitting diode (OLED) display devices, electrophoretic display (EPD) devices, etc.

Recently, studies on foldable display devices, which are bendable or foldable and can therefore be used in a greater variety of applications, have been actively conducted.

A foldable display device can be configured by connecting flat display panels, or can be configured to include a display panel having flexibility, that is, a flexible display panel.

A flexible display panel refers to a display panel that is pliable, bendable, foldable, or rollable like paper, while maintaining the display characteristics of general flat display panels.

The flexible display panel can be configured to include a plastic substrate that is deformable or can be shaped by external pressure.

The plastic substrate can have a structure in which a base film is coated on both surfaces thereof with a barrier coating. The base film can be formed of various kinds of resin such as, for example, polyimide (PI), polycarbonate (PC), polyethylene terephthalate (PET), polyethersulfone (PES), polyethylene naphthalate (PEN), or fiber-reinforced plastic (FRP). The barrier coating can be applied on the two opposite surfaces of the base film. An organic film or an inorganic film can be used as the barrier coating in order to maintain flexibility.

The flexible display panel is capable of being rolled or folded into various shapes due to its flexibility. A flexible display device, to which the flexible display panel is applied, requires a case for protecting the flexible display panel and various other components accommodated in the case. Thus, the flexible display device faces many problems that should be overcome in order to realize deformability by which the entire display device is capable of being deformed or reshaped to any desired shape.

On the other hand, a foldable display device can be configured to be folded and unfolded with a relatively simple mechanical structure.

The foldable display device generally includes a flexible display panel and a housing for allowing the flexible display panel to be maintained in a predetermined shape or at a predetermined folding angle.

In order to allow the flexible display panel to be maintained in a predetermined shape or at a predetermined folding angle, the foldable display device requires a hinge mechanism at a location corresponding to the folding area of the display panel. The hinge mechanism generally used in the related art can be embodied by links connected in various manners or gears meshing with one another so as to realize a folding operation through pivoting movement thereof.

Figure 1:
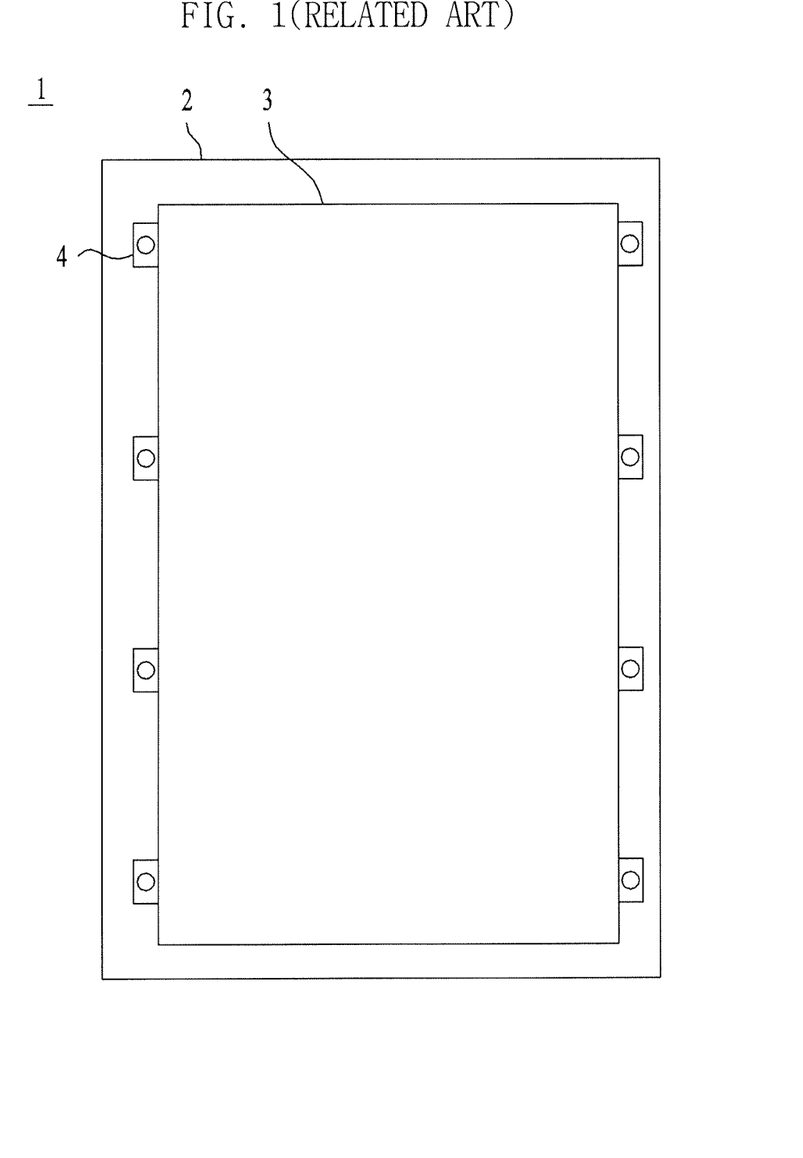
FIG. 1 is a plan view illustrating the structure of coupling a lower plate to a housing in a foldable display device of the related art.

FIG. 1 illustrates a lower plate 3 for connecting a display panel to a housing 2 in a foldable display device 1 of the related art. As shown in FIG. 1, the lower plate 3 includes coupling portions 4 protruding from both ends thereof, so as to be fixed onto the housing 2. The display panel is coupled to the top surface of the lower plate 3. In this manner, the foldable display device 1 is constituted.

However, the structure of coupling the display panel to the housing using the coupling portions protruding from both ends of the lower plate, as shown in FIG. 1, leads to an increase in the area of a bezel proportional to the area occupied by the coupling portions protruding from the lower plate.

SUMMARY OF THE INVENTION

Accordingly, the present invention is directed to a foldable display device that substantially obviates one or more problems due to limitations and disadvantages of the related art.

An object of the present invention is to provide a foldable display device that is capable of minimizing an increase in the area of a bezel by improving the structure of coupling a flexible display panel to a housing via a lower plate and that is capable of simplifying a process of coupling the lower plate to the housing.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a foldable display device that is capable of realizing a slim bezel design by eliminating coupling portions protruding from both ends of a lower plate and that enables convenient and easy coupling of the lower plate to a housing by providing a mounting member at a location between the lower plate and the housing.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

Reference will now be made in detail to the preferred embodiments of the present invention, examples of which are illustrated in the accompanying drawings. In the drawings, the same or similar elements are denoted by the same reference numerals even when they are depicted in different drawings. In the following description of the present invention, a detailed description of known functions or known configurations incorporated herein will be omitted when it can make the subject matter of the present invention rather unclear. Some features illustrated in the drawings are exaggerated, reduced or simplified for convenience in description and clarity, and the drawings and elements in the drawings are not always illustrated at the actual scale. However, these details will be easily understood by those skilled in the art.

Figure 2:
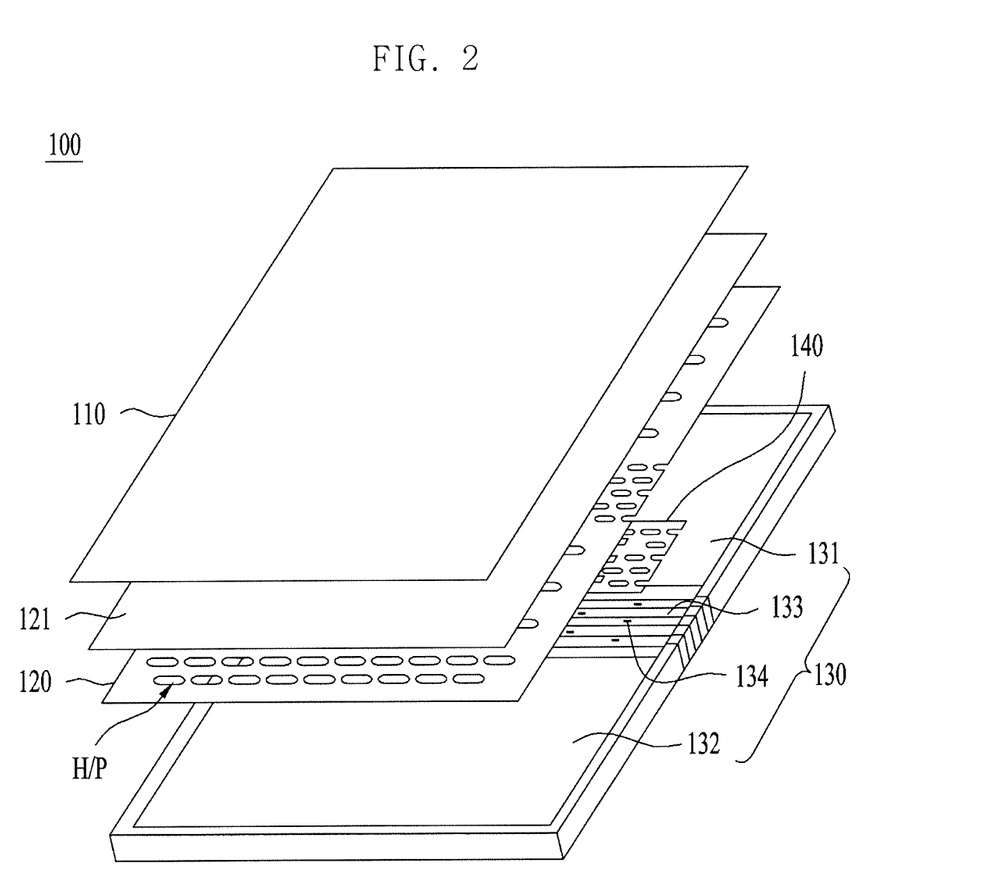
FIG. 2 is an exploded perspective view illustrating the coupling structure of a foldable display device according to an embodiment of the present invention.
Figure 3:
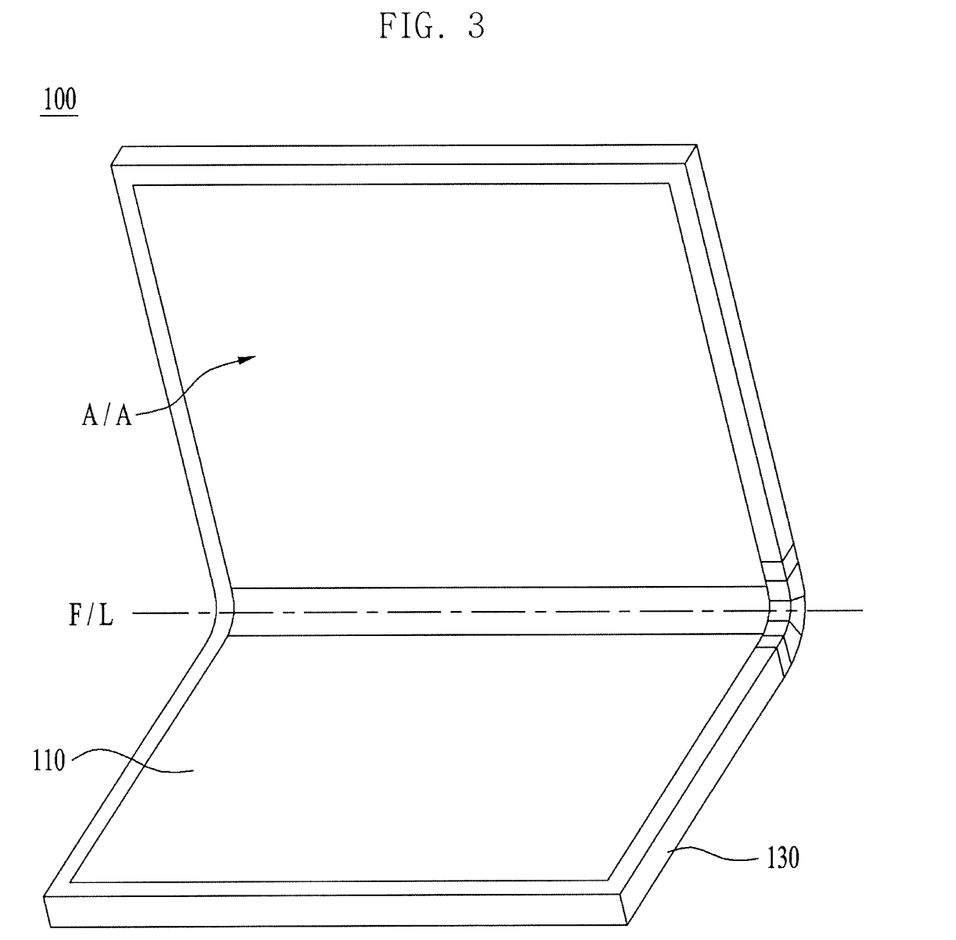
FIG. 3 is a perspective view illustrating the folded state of the foldable display device shown in FIG. 2 after being assembled.

FIG. 2 is an exploded perspective view illustrating the coupling structure of a foldable display device according to an embodiment of the present invention, and FIG. 3 is a perspective view illustrating the folded state of the foldable display device shown in FIG. 2 after being assembled. All the components of the foldable display devices according to all embodiments of the present invention are operatively coupled and configured.

Referring to FIGS. 2 and 3, a foldable display device 100 according to the embodiment of the present invention includes a display panel 110 for displaying an image, a lower plate 120 coupled to the bottom surface of the display panel 110, a housing 130 coupled to the bottom surface of the lower plate 120, and a mounting member 140 for coupling the lower plate 120 to the housing 130.

The display panel 110 is configured to be folded along a folding line F/L. Upon an actual folding operation, the display panel 110 is not sharply folded at a certain angle along the folding line F/L, but is folded in stages or in sequence with a predetermined curvature by a folding member 133 of the housing 130. Therefore, the folding line F/L is a line that passes through a predetermined folding area. Specifically, the folding line F/L, which is represented by the dotted line in FIG. 3, is an imaginary line that represents the center of the folding area, which is folded with a predetermined curvature upon the folding operation. The lower plate 120, the housing 130 and the mounting member 140 are also folded together along the folding line F/L.

The display panel 110 can be embodied by a flexible display panel, which has pliable or bendable characteristics, or can be embodied by a rigid flat display panel, which is not easily deformed by external force and is maintained in a flat state.

In the case in which the display panel 110 is embodied by a flexible display panel, an organic light-emitting diode (OLED) display panel, an electrophoretic display (EPD) panel, or an electrochromic display (ECD) panel can be used as the flexible display panel.

In the case in which the display panel 110 is embodied by a flat display panel, in order to realize foldability, multiple flat display panels can be connected to each other so as to be physically folded relative to each other, or a single flat display panel can be configured to include a flexible portion formed therein, by which the flat display panel can be folded. A liquid crystal display (LCD) panel or a plasma display panel (PDP) can be used as the flat display panel. In the case of a foldable display device in which multiple flat display panels are connected to each other so as to be physically folded relative to each other, each of the flat display panels can be connected with a corresponding circuit unit.

The display panel 110 includes an active area A/A in which an image is displayed, and a non-active area which is located around the active area and in which no image is displayed. An extension line of a signal line and a bonding region, in which the extension line is connected to the circuit unit, can be provided in the non-active area. The circuit unit serves to apply an electrical signal for driving the display panel, and includes a substrate on which a circuit pattern in provided, and an integrated circuit (IC) chip mounted on the substrate. The substrate includes a main substrate on which the IC chip is mounted, and a connection substrate which connects the main substrate to the display panel. The main substrate can include a single-layered or multi-layered wiring pattern. The main substrate can be configured as a rigid printed circuit board (PCB) which is not easily bent or folded, or can be configured as a flexible printed circuit board (FPCB) which has flexibility. The connection substrate can include a single-layered or multi-layered wiring pattern, and can be configured to be easily bent or folded. The connection substrate can be configured as a flexible printed circuit board (FPCB), or can be configured to have a chip-on-film (COF) structure.

The non-active area is located along the edges of the top surface of the display panel 110, and the active area for displaying an image is located at a position further inward than the non-active area. The following description is given on the assumption that the foldable display device 100 of the present invention is of an inner folding type, by way of example, in which the active area is folded in the inward direction such that a portion thereof faces a remaining portion thereof. Various optical sheets or a protective film for protecting the display panel 110 can be additionally provided on the display panel 110.

The lower plate 120 is coupled to the bottom surface of the display panel 110. The lower plate 120 coupled to the bottom surface of the display panel 110 prevents the display panel 110 from coming into direct contact with the surface of the housing 130. The mounting member 140 is coupled to the bottom surface of the lower plate 120 in order to couple the display panel 110 and the lower plate 120 to the folding member 133 of the housing 130.

A skin layer 121 can be additionally provided between the display panel 110 and the lower plate 120. The skin layer 121 is configured as a thin shielding film, which prevents the components disposed under the bottom surface of the display panel 110 from being seen through the active area of the display panel 110. The skin layer 121 is formed of polyurethane (PU), silicon, polyethylene terephthalate (PET), or a rubber-based material. Therefore, the skin layer 121 can also serve to prevent damage attributable to friction, which can be generated between the display panel 110 and the lower plate 120 during the folding operation.

The skin layer 121 can be attached to the lower plate 120 using an adhesive, or can be formed on the lower plate 120 through a lamination method.

The lower plate 120 is configured as a thin plate that is formed of a metal material and has a size corresponding to the size of the display panel 110. The lower plate 120 serves to prevent the display panel 110 from being bent in undesired directions or at undesired angles. The lower plate 120 can also serve to dissipate heat from a heat emission portion. The lower plate 120 and the mounting member 140, which is securely coupled to the bottom surface of the lower plate 120, stably support the display panel 110.

The lower plate 120 has a hole pattern H/P of holes formed over an entire surface of the lower plate 120. The size or number of holes, which constitute the hole pattern H/P, can vary locally or over the entire surface of the lower plate 120 depending on the desired elastic restoring force of the folding area of the lower plate 120. The holes of the hole pattern H/P, which are formed in a region of the lower plate 120 corresponding to the folding member 133 of the housing 130, can be arranged more densely than the holes formed in the other areas of the lower plate 120. Specifically, the holes of the hole pattern H/P are formed to be greater in number and smaller in size and are arranged more densely in the region of the lower plate 120 corresponding to the folding member 133 of the housing 130 than in the other areas of the lower plate 120. Accordingly, the region of the lower plate 120 corresponding to the folding member 133 of the housing 130 can be easily folded due to the relatively high density of holes formed therein.

As shown in FIGS. 2 and 3, the housing 130 includes a first plate 131 which supports a portion of the bottom surface of the display panel 110, a second plate 132 which supports a remaining portion of the bottom surface of the display panel 110, and the folding member 133 which is formed at a location corresponding to the folding area of the display panel 110 and in which the first plate 131 and the second plate 132 are connected to each other. Therefore, the display panel 110 is folded and unfolded by the folding/unfolding operation of the folding member 133 of the housing 130.

The first plate 131 and the second plate 132 include respective planar regions, which have predetermined sizes for accommodating the display panel 110 and the lower plate 120. The first plate 131 and the second plate 132 also exhibit the function of a case for protecting the outer side of the display panel 110.

In order to prevent undesired sliding of a portion of the display panel 110 while the display panel 110 is folded on the top surface of the housing 130, structures for guiding sliding movement of a portion of the top surface or the side surfaces of the display panel 110 can be provided at the top surfaces of the first plate 131 and the second plate 132.

The first plate 131 and the second plate 132 are connected to each other via multiple hinge mechanisms or link mechanisms in the folding member 133. The folding member 133 of the housing 130 is folded in stages or in sequence with a predetermined curvature in a manner such that the first plate 131 and the second plate 132 pivot relative to each other about the hinge mechanisms or the link mechanisms. The following description of the embodiment of the present invention is given on the assumption that the first plate 131 and the second plate 132 have the same planar region as each other and that the folding member 133 is formed in the center of the housing 130. The position of the folding member 133, the direction in which the folding member 133 is formed, and the number of folding areas can vary depending on the construction of the display device 100.

The housing 130 includes a plurality of fastening holes 134 formed in the top surface of the folding member 133, which faces the display panel 110. The mounting member 140 is inserted into and fixed into the fastening holes 134. The position and size of the fastening holes 134 can vary depending on the configuration of the mounting member 140. The coupling of the mounting member 140 to the fastening holes 134 can enable the multiple hinge mechanisms or link mechanisms in the folding member 133 to be folded or rotated the same distance or at the same angle as one another. That is, since the mounting member 140 is coupled to the folding member 133 at a plurality of locations at which the fastening holes 134 are formed, it is possible to prevent any portion of the folding member 133 from being rotated at undesired angles and consequently enables the folding member 133 to be folded evenly.

Figure 4:
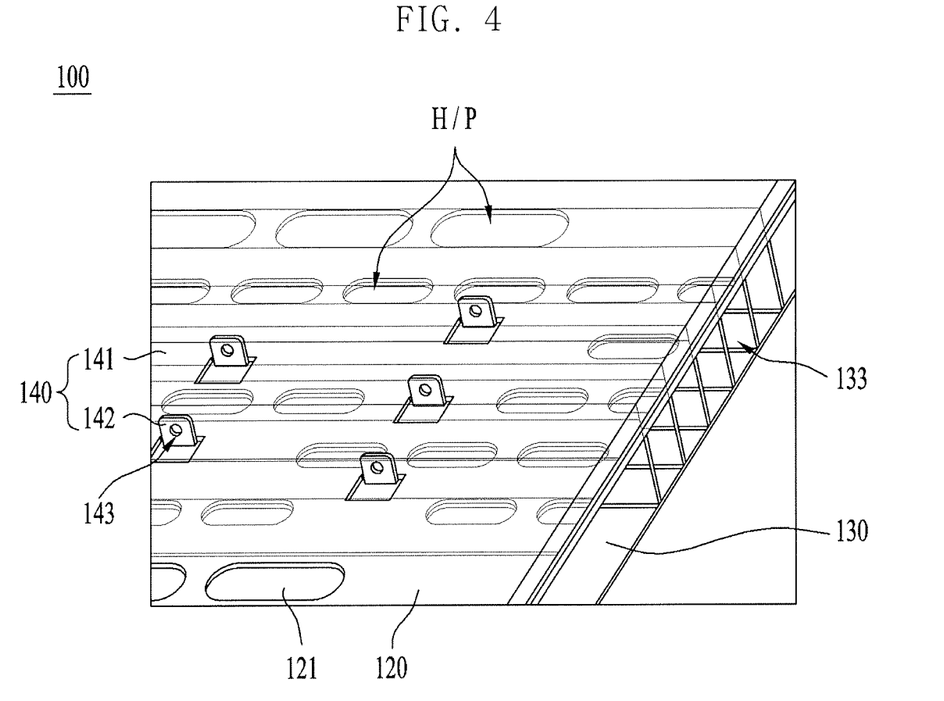
FIG. 4 is an enlarged perspective view illustrating a portion of the bottom surface of the foldable display device shown in FIG. 2.
Figure 5:
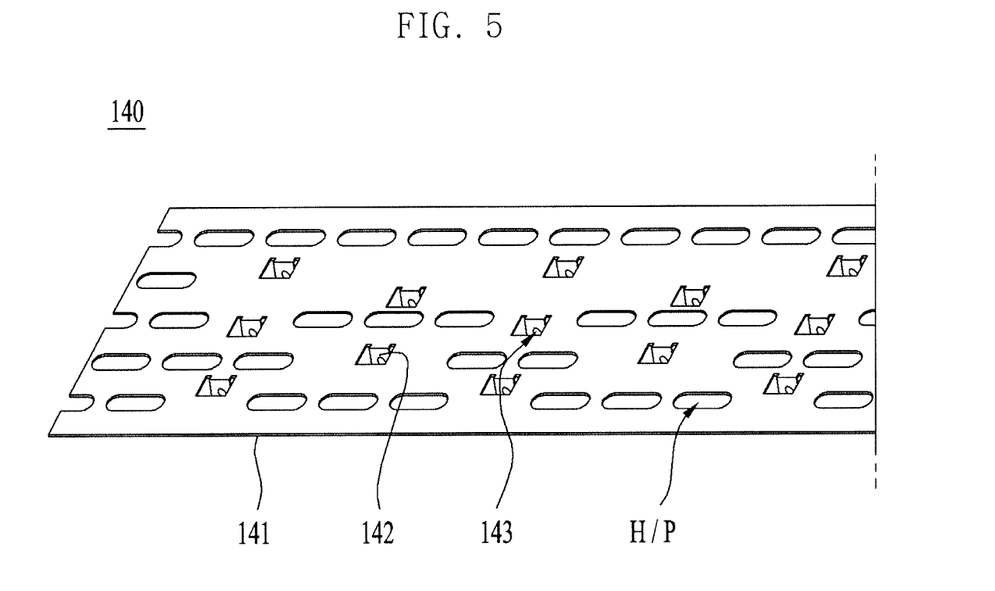
FIG. 5 is a perspective view illustrating a mounting member of the foldable display device shown in FIG. 2.

FIG. 4 is an enlarged perspective view illustrating a portion of the bottom surface of the foldable display device shown in FIG. 2. FIG. 5 is a perspective view illustrating the mounting member of the foldable display device shown in FIG. 2. In the following description, the same reference numerals as those used above preferably denote the same components.

Referring to FIGS. 4 and 5, the mounting member 140 is coupled to the bottom surface of the lower plate 120 at a position corresponding to the position of the folding member 133 of the housing 130. The mounting member 140 is formed to have a small thickness using a metal material. The mounting member 140 and the lower plate 120 are welded to each other. Alternatively, the mounting member 140 and the lower plate 120 can be coupled to each other using a fastener or an adhesive.

The mounting member 140 includes a fastening plate 141, which is formed in a plate shape and is interposed between the lower plate 120 and the folding member 133, and insertion pieces 142, which extend from the fastening plate 141 at positions corresponding to the positions of the fastening holes 134.

The fastening plate 141 of the mounting member 140 is coupled to the lower plate 120. The fastening plate 141 is welded to the lower plate 120, as described above. The fastening plate 141 has therein a hole pattern H/P that is the same as the hole pattern H/P in the lower plate 120. The hole pattern H/P in the mounting member 140 can exhibit a heat dissipation function, like the hole pattern in the lower plate 120.

The insertion pieces 142 are formed integrally with the fastening plate 141, and extend from the fastening plate 141 toward the fastening holes 134. That is, the insertion pieces 142 protrude from the bottom surface of the fastening plate 141 and are inserted into the fastening holes 134. Each of the insertion pieces 142 has therein at least one locking hole 143. The locking hole 143 penetrates the corresponding insertion piece 142. After each of the insertion pieces 142 is inserted into a corresponding one of the fastening holes 134, a fastener is fastened into the locking hole 143 in order to prevent each of the insertion pieces 142 from being separated from a corresponding one of the fastening holes 134. Although not illustrated in the drawings, in the case in which it is impossible to fasten the fastener into the locking hole 143, each of the insertion pieces 142 can have a separation-preventing piece that protrudes in a direction perpendicular to the direction in which each of the insertion pieces 142 is inserted into a corresponding one of the fastening holes 134 in order to prevent each of the insertion pieces 142 from being separated from a corresponding one of the fastening holes 134. For example, the separation-preventing piece can be a hook that protrudes integrally from both surfaces of the insertion piece 142.

Figure 6:
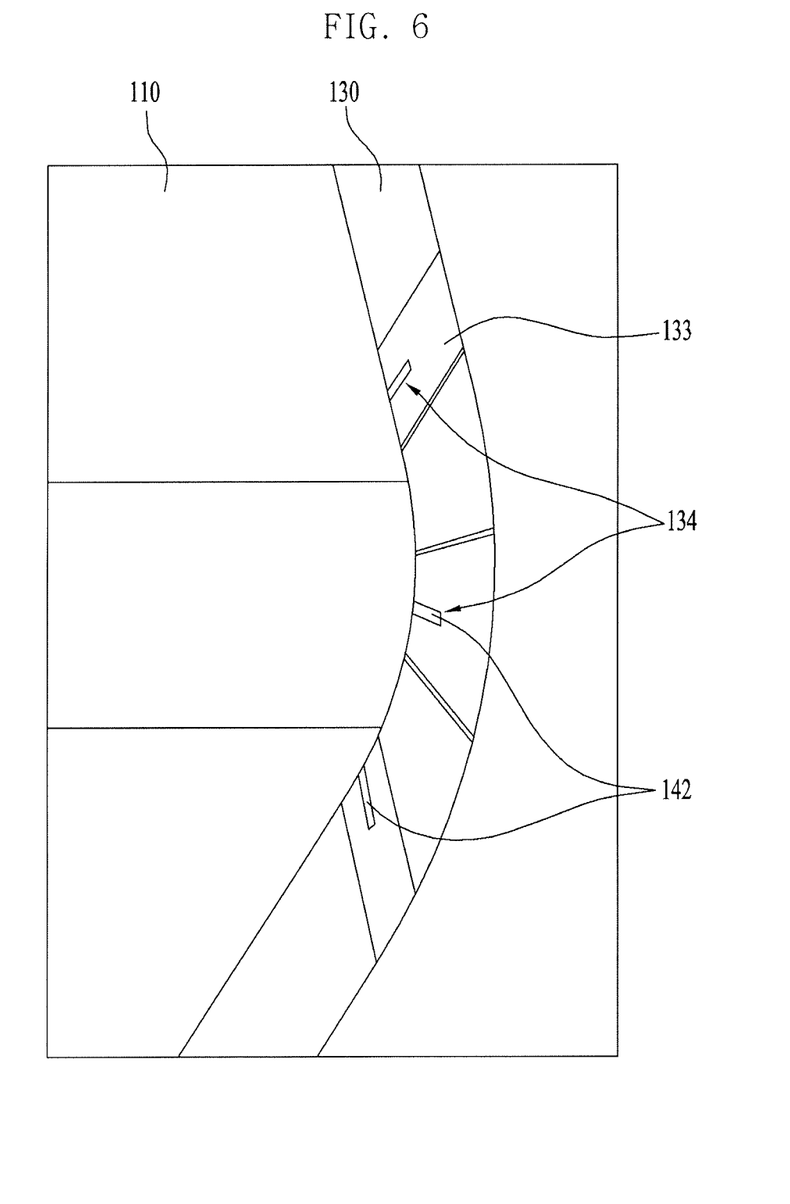
FIG. 6 is a schematic view illustrating the folded state of the folding member of the foldable display device shown in FIG. 3 in an enlarged manner.

FIG. 6 is a schematic view illustrating the folded state of the folding area of the foldable display device shown in FIG. 3 in an enlarged manner.

Referring to FIG. 6, as described above, each of the insertion pieces 142 is formed at a position corresponding to the position of a respective one of the fastening holes 134. The insertion pieces 142 are provided in the direction in which the folding member 133 of the housing 130 is folded. For example, in the case in which the multiple hinge mechanisms or link mechanisms in the folding member 133 are configured to be rotated in the circumferential direction about the folding line F/L, at least two insertion pieces 142 are provided at the fastening plate 141 in a direction parallel to the circumferential direction. This coupling of the insertion pieces 142 formed at the fastening plate 141 to the fastening holes 134 formed in the folding member 133 enables the multiple hinge mechanisms or link mechanisms, which are arranged in the circumferential direction in the folding member 133, to be folded or rotated the same distance or at the same angle as one another.

The fastening plate 141 is formed to have a size equivalent to the area of the folding member 133 of the housing 130, and is folded and unfolded in accordance with the operation of folding and unfolding the folding member 133.

As is apparent from the above description, the foldable display device according to the embodiments of the present invention has at least the following effects and advantages.

First, a slim bezel design can be realized by improving the coupling structure between the lower plate and the housing.

Second, an assembly process can be simplified and a processing time can be shortened by coupling the lower plate to the housing using the mounting member.

Lastly, the folding area of the housing can be folded evenly by the mounting member, thereby enabling the display panel to be folded with a uniform curvature.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A foldable display device comprising:
 a display panel configured to be bent elastically;
 a lower plate coupled to a bottom surface of the display panel;
 a housing disposed under a bottom surface of the lower plate to accommodate the display panel and the lower plate, the housing being configured to be folded or unfolded at a folding area thereof so that an active area of the display panel is bent within the housing; and
 a mounting member coupled to the bottom surface of the lower plate at a position corresponding to a position of the folding area of the housing.

2. The foldable display device according to claim 1, wherein the housing comprises:
 a first plate for supporting a portion of the bottom surface of the display panel;
 a second plate for supporting a remaining portion of the bottom surface of the display panel; and
 a folding member disposed between the first plate and second plate so as to fold or unfold the display panel at the folding area,
 wherein the folding member comprises at least one fastening hole formed in a top surface thereof so as to insert the mounting member thereinto.

3. The foldable display device according to claim 2, wherein the mounting member comprises:
 a fastening plate formed in a plate shape, the fastening plate being interposed between the lower plate and the folding member; and
 at least one insertion piece extending integrally from the fastening plate so as to be inserted into and fixed into the at least one fastening hole.

4. The foldable display device according to claim 3, wherein the at least one insertion piece comprises a locking hole formed therein so as to allow a fastener to be fastened thereinto in order to prevent the at least one insertion piece from being separated from the at least one fastening hole.

5. The foldable display device according to claim 3, wherein the fastening plate is formed to have a size equivalent to the folding area of the folding member, and is folded in a direction in which the folding member is folded in accordance with an operation of folding the folding member.

6. The foldable display device according to claim 3, wherein the lower plate has a predetermined hole pattern, and
 wherein the fastening plate has a hole pattern corresponding to the predetermined hole pattern in the lower plate.

7. The foldable display device according to claim 6, wherein the predetermined hole pattern in the lower plate is formed such that holes are formed to be greater in number or smaller in size per local union in a folding area of the lower plate corresponding to the folding member than another area of the lower plate.

8. The foldable display device according to claim 3, wherein the at least one fastening hole and the at least one insertion piece respectively include a plurality of fastening holes and a plurality of insertion pieces.

9. The foldable display device according to claim 3, further comprising a skin layer provided between the display panel and the lower plate.

10. The foldable display device according to claim 9, wherein the skin layer is formed of any one of polyurethane (PU), silicon, polyethylene terephthalate (PET), or a rubber-based material.

11. The foldable display device according to claim 9, wherein the skin layer is attached to the lower plate by an adhesive.

12. The foldable display device according to claim 1, wherein the lower plate is configured as a thin plate which is formed of a metal.

13. The foldable display device according to claim 12, wherein the lower plate is configured to dissipate heat from a heat emission portion.

14. The foldable display device according to claim 6, wherein a density of the predetermined hole pattern of the lower plate corresponding to the folding area of the folding member is greater than a density of the predetermined hole pattern of holes in other areas of the lower plate.

15. The foldable display device according to claim 1, wherein the mounting member has a hole pattern of holes formed over an entire surface of the mounting member.

16. The foldable display device according to claim 1, wherein the mounting member is configured as a thin plate that is formed of a metal.

17. The foldable display device according to claim 2, wherein a size of the first plate is equal to a size of the second plate.

18. The foldable display device according to claim 2, wherein the folding member is formed in a center of the housing.

* * * * *